Feb. 12, 1952     F. LUSTIG     2,585,258
BASE FOR MOTION-PICTURE PROJECTORS
Filed Feb. 20, 1950     3 Sheets-Sheet 1
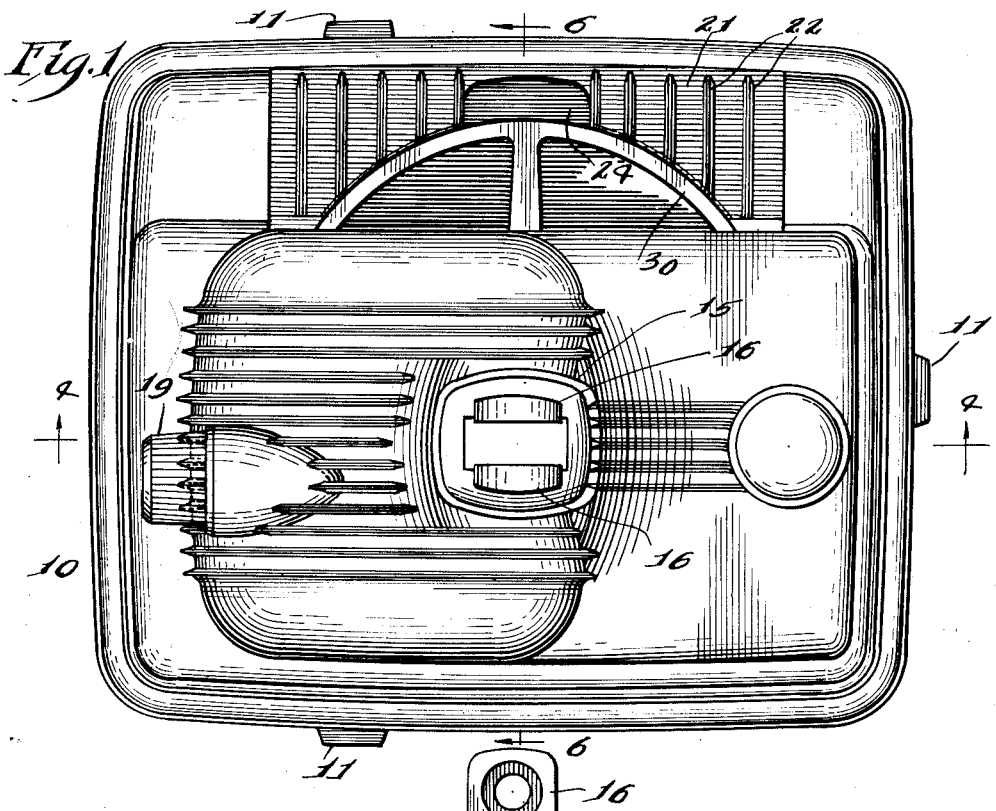
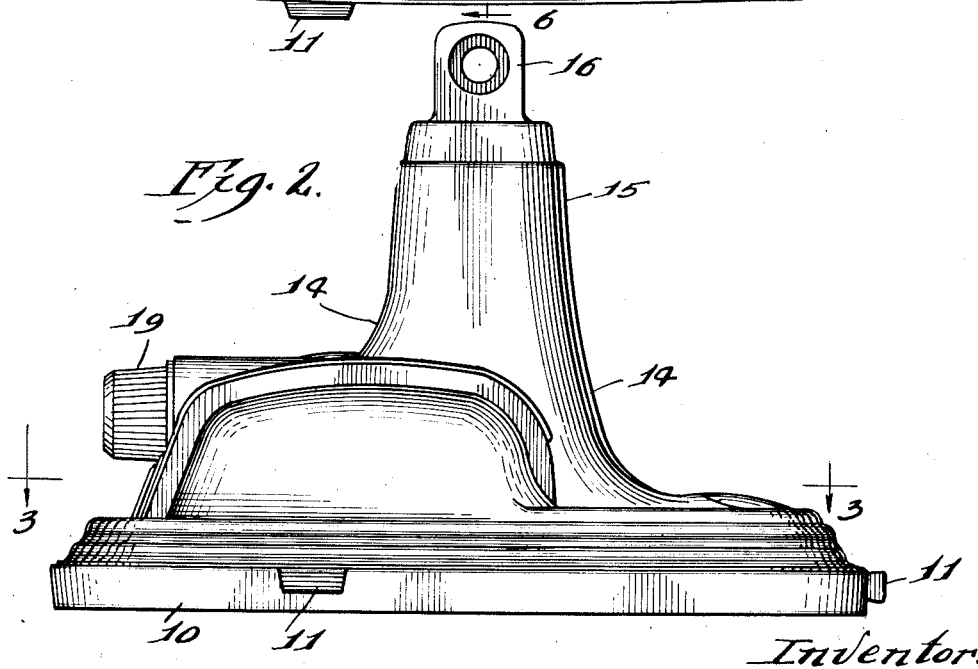
Inventor.
Frank Lustig.
By Zabel and Gritzbaugh
Attorneys.

Feb. 12, 1952  F. LUSTIG  2,585,258
BASE FOR MOTION-PICTURE PROJECTORS
Filed Feb. 20, 1950  3 Sheets-Sheet 2
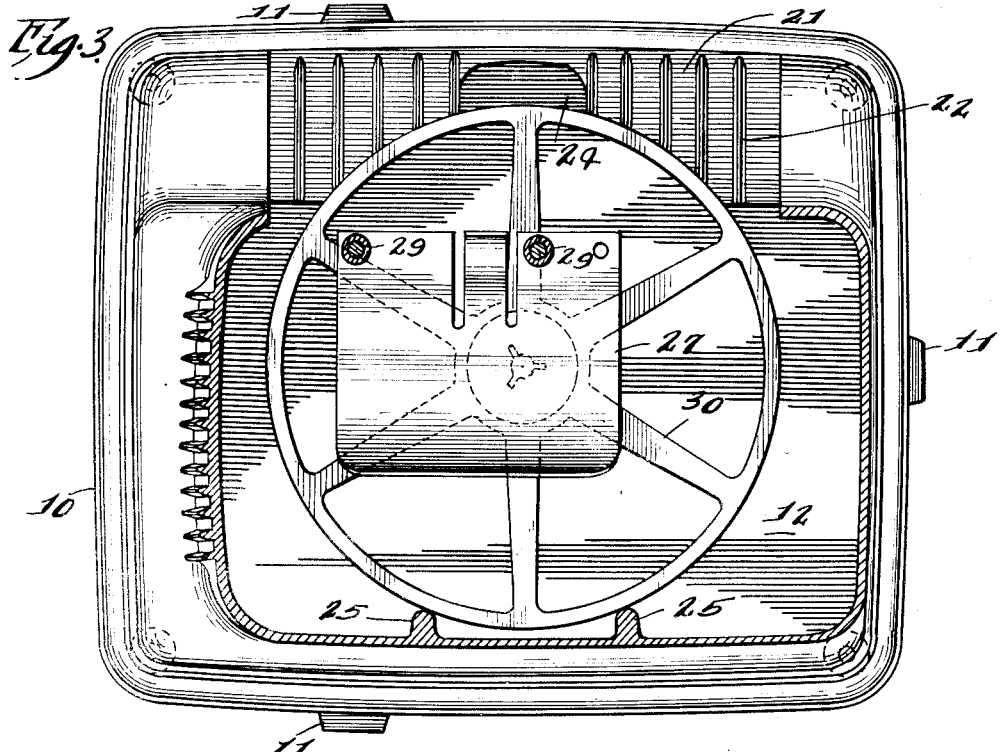
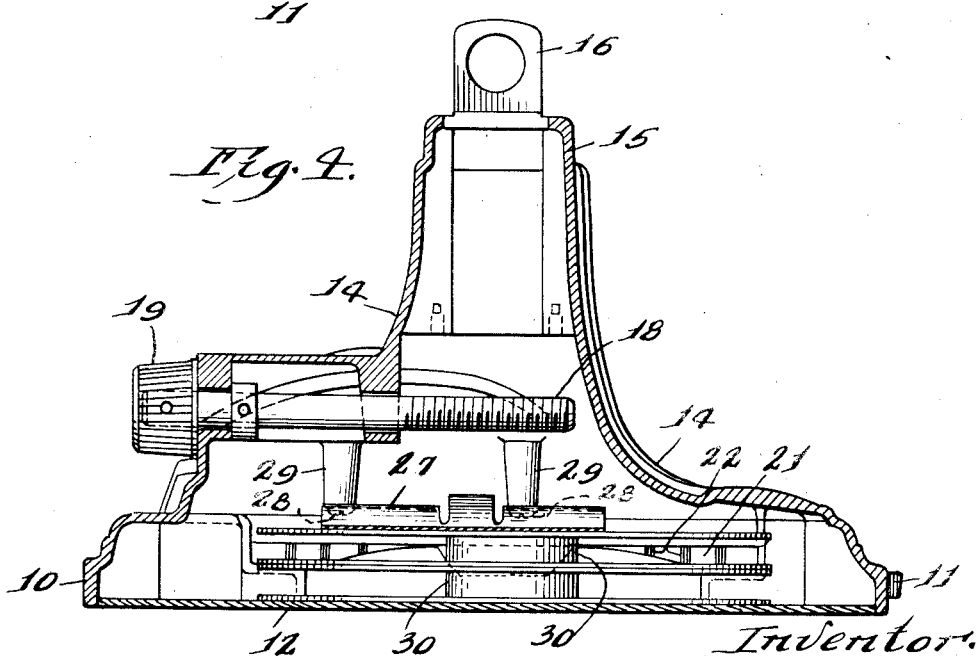
Inventor:
Frank Lustig.
By Zabel and Gritzbaugh
Attorneys.

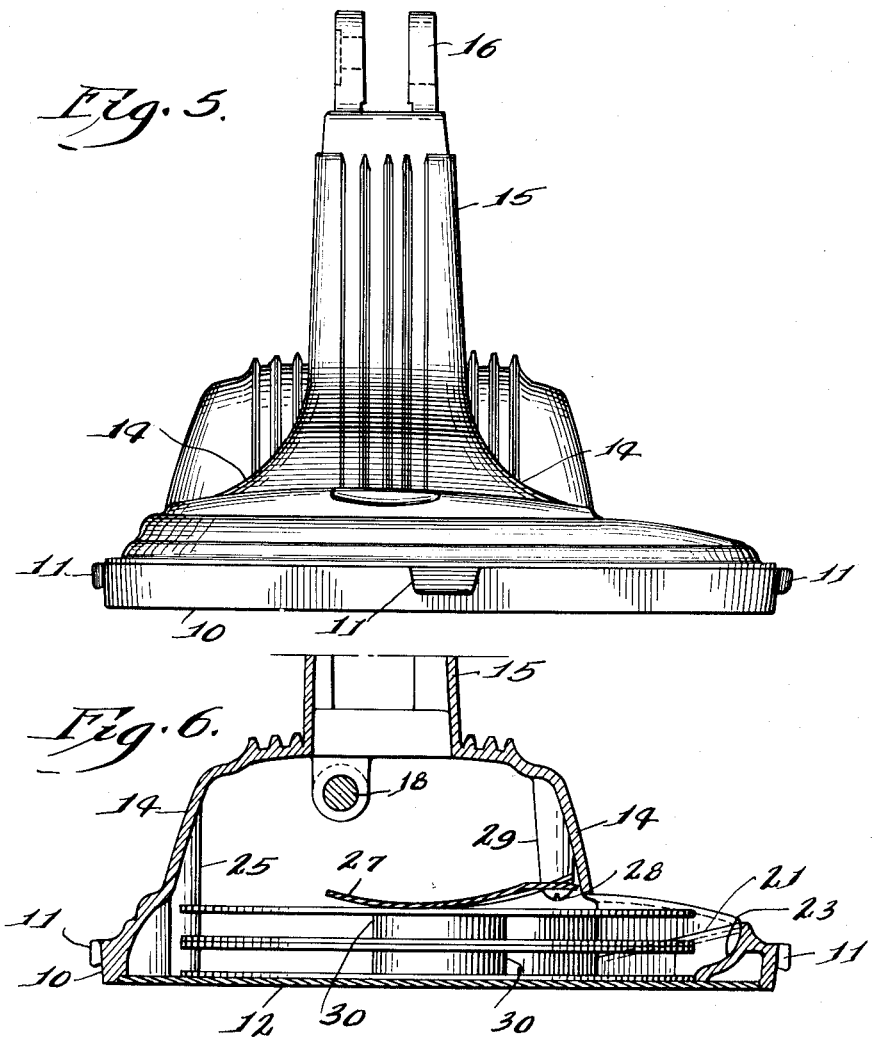

Patented Feb. 12, 1952

2,585,258

UNITED STATES PATENT OFFICE 2,585,258

BASE FOR MOTION-PICTURE PROJECTORS

Frank Lustig, Chicago, Ill., assignor to Revere Camera Company

Application February 20, 1950, Serial No. 145,193

4 Claims. (Cl. 312—20)

My invention relates to a supporting base for a motion picture projector. It is characterized by the provision in the base of a storage compartment for film reels.

Motion picture projectors designed for amateur use normally are provided with enclosed carrying cases which serve to protect the projectors when not in use, and to make the projectors readily portable. As is well known, each projector uses two film reels, the film storage reel, and the take-up reel. These two reels, when in operating position on the projector, destroy the otherwise compact contour of the projector. Accordingly, carrying cases are designed to fit over the projector with the reels removed. However, provision must be made for storing the reels within the carrying case.

Heretofore, the carrying cases themselves have been provided with auxiliary compartments to receive the reels. This adds to the expense of the carrying case, and, more seriously, the reels are not always conveniently handy to the projector when their use is desired.

Accordingly, one object of the invention is to provide a reel storage compartment forming a part of the projector itself, so that the reels stored therein will at all times be conveniently handy to the projector. To this end I provide a reel storage compartment in the projector base. This compartment is adequate in size to receive and store a plurality of film reels. An opening is provided in one of the base sides for the entrance and withdrawal of the reels. Also, a spring or other suitable means is provided to apply a moderate holding pressure to the reels when inside the compartment.

Another object of my invention is to provide a base of this character that consists essentially of a single casting. Bosses are provided within the casting to serve as positioning stops for the stored reels. Also, the casting has lateral bosses that cooperate with hasps mounted on the carrying case to secure the case to the projector base.

Other objects and advantages of my invention will be apparent as the description proceeds, reference being had to the accompanying drawings which illustrate one structural form of my invention. It is to be understood, of course, that in a practical commercial application of the invention, various features are necessarily susceptible of changes in details and structural arrangements. The scope of the invention is to be measured by the claims hereinafter set forth.

In the drawings:

Fig. 1 is a top plan view of a motion picture projector base embodying my invention;

Fig. 2 is a view in side elevation of the side opposite the entrance opening;

Fig. 3 is a sectional view on line 3—3 of Fig. 2;

Fig. 4 is a sectional view on line 4—4 of Fig. 1;

Fig. 5 is a front elevational view of the base, and

Fig. 6 is a sectional view on line 6—6 of Fig. 1.

Referring to the drawings, the general external and internal shape and details of my improved projector base are clearly illustrated. As mentioned, the base, except a bottom closure, is preferably formed of a single casting. The material used may be any structurally strong material suitable for the casting process.

Lower portion 10 of the base is shown generally rectangular in shape. Bosses 11 protrude at spaced intervals from the sides of lower portion 10 to be engaged by cooperating hasps mounted on the carrying case.

The bottom of the casting is open for withdrawal of the inner mold, and this opening is later covered by a bottom closure 12 (Figs. 4 and 6) suitably secured by screws at its four corners.

Lower portion 10 has a vertical dimension sufficient to receive a plurality of superimposed film reels of the size used with the projector for which the base is designed. This dimension will vary depending upon whether the projector uses 8 mm. or 16 mm. film.

Above lower portion 10, the surface of the base tapers generally inwardly and upwardly, as shown at 14, and terminates in a central, hollow pedestal 15. A pair of spaced lugs 16 are provided on the pedestal top for mounting the projector on the base, the projector being mountable to lugs 16 in a pivotal manner so that the "tilt" of the projector may be readily adjusted.

Referring to Fig. 4, the aforesaid tilting action is governed by a threaded shaft 18 that extends longitudinally within the base. This shaft is rotated by means of a control knob 19 conveniently located at the rear of the base. The projector itself carries a downwardly extending member (not shown) that engages the threads of shaft 18 so that the member is positioned responsive to the adjustment of control knob 19.

One of the long sides of lower portion 10 is provided with an opening for the entrance and withdrawal of the film reels. This opening is best shown in Figs. 1, 3 and 6. The opening has a downwardly inclined guide track 21 of a width corresponding with the diameter of the film reels for which the base is designed. Guide track 21 is preferably provided with a plurality of upstanding ribs 22 which function as antifriction elements. Also, track 21 is recessed or cut away in an arcuate manner to accommodate a portion of the periphery of an inserted film reel. The shape of this recess is best shown in Figs. 1 and 3. A further recess 24 is provided in the center of guide track 21, this latter recess being adapted to receive the fingers of the operator when withdrawing the reels from the storage compartment.

In order to properly position the inserted reels within the base, a pair of spaced positioning bosses 25, Figs. 3 and 6, are provided. These bosses 25, referred to as stop members in the claims, extend vertically downward from the side of the base interior opposite the entrance opening, and they terminate on the plane occupied by bottom closure 12. If desired, the bosses, alternatively, may be carried by bottom closure 13. The function of bosses 25 in positioning the reels in cooperation with the major recess of guide track 21 is readily seen in Fig. 3.

To avoid having the inserted film reels stored in a loose manner, a means is provided to apply a moderate holding pressure on the reels. In the form of the invention illustrated, this means takes the form of a horizontally disposed, curved leaf spring 27 (Figs. 3, 4 and 6). Spring 27 is anchored by screws 28 to bosses 29 (Figs. 4 and 6) formed on the interior of the base immediately above the entrance opening. As shown in Fig. 6, the spring curves downwardly from the bosses and terminates in an upward curve so that only a convex portion of the spring actually bears against the uppermost of the' superimposed reels. As mentioned, spring 27 is positioned to apply a moderate holding pressure on the reels.

Film reels 30 are shown in storage position in the base in Figs. 3, 4 and 6.

From the above description it is thought that the construction and advantages of my invention will be readily apparent to those skilled in the art. As mentioned, various changes and modifications may be made without departing from the spirit or losing the advantages of the invention.

Having thus described my invention, what I claim as new and desire to secure by Letters Patent is:

1. A base for a motion picture projector comprising a single casting open at the bottom, a closure for said bottom, one side of said casting having an entrance opening adapted to pass film reels to the casting interior, a pair of spaced stop members extending downwardly from the casting side opposite said entrance opening to position the film reels within said casting, the space within said casting being of a size to accommodate a plurality of superimposed film reels for storage purposes, and a horizontally disposed, curved leaf spring carried by said casting and positioned to apply a holding pressure to the upper of the superimposed film reels.

2. The combination of claim 1 wherein said entrance opening includes a downwardly inclined guide track, said track being recessed in an arcuate manner to accommodate a portion of the periphery of an inserted film reel.

3. A base for a motion picture projector comprising a single casting open at the bottom, a closure for said bottom, one side of said casting having an entrance opening adapted to pass film reels to the casting interior, means opposite said entrance opening to position the film reels within said casting, the space within said casting being of a size to accommodate a plurality of superimposed film reels for storage purposes, and spring means positioned to apply a holding pressure to the film reels.

4. A base for a motion picture projector comprising a hollow shell open at the bottom, a closure for said bottom, one side of said shell having an entrance opening adapted to pass film reels to the shell interior, means opposite said entrance opening to position the film reels within said shell, the space within said shell being of a size to accommodate a plurality of superimposed film reels for storage purposes, and spring means positioned to apply a holding pressure to the film reels.

FRANK LUSTIG.

REFERENCES CITED

The following references are of record in the file of this patent:

UNITED STATES PATENTS

| Number | Name | Date |
|---|---|---|
| 1,302,800 | Jenkins | May 6, 1919 |
| 1,326,997 | Uebelmesser | Jan. 6, 1920 |
| 1,383,683 | Wenderhold | July 5, 1921 |
| 2,278,295 | Wilson | Mar. 31, 1942 |
| 2,422,032 | Mihalyi | June 10, 1947 |

FOREIGN PATENTS

| Number | Country | Date |
|---|---|---|
| 239,963 | Switzerland | Nov. 30, 1945 |
| 293,217 | Germany | Feb. 5, 1914 |